(12) United States Patent
Dabelstein et al.

(10) Patent No.: US 6,323,468 B1
(45) Date of Patent: Nov. 27, 2001

(54) STATIC COIL APPARATUS AND METHOD FOR WELDING THERMOPLASTIC COMPOSITE STRUCTURES

(75) Inventors: Donald K. Dabelstein; Larry E. Dolan, both of Renton; Stephen Christensen, Issaquah; David S. Nansen, Bellevue, all of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/557,883

(22) Filed: Apr. 25, 2000

(51) Int. Cl.[7] .............................. B23K 13/01; H05B 6/10
(52) U.S. Cl. ..................... 219/617; 219/603; 219/633; 219/634; 219/645; 219/672
(58) Field of Search ...................... 219/672, 674, 219/675, 617, 633, 634, 635, 645; 156/272.4

(56) References Cited

U.S. PATENT DOCUMENTS

| | | | |
|---|---|---|---|
| 5,240,542 | * 8/1993 | Miller et al. ................. | 156/272.4 |
| 5,313,037 | 5/1994 | Hansen et al. . | |
| 5,338,497 | 8/1994 | Murray et al. . | |
| 5,444,220 | 8/1995 | Hansen et al. . | |
| 5,486,684 | 1/1996 | Peterson et al. . | |
| 5,500,511 | 3/1996 | Hansen et al. . | |
| 5,508,496 | 4/1996 | Hansen et al. . | |
| 5,529,703 | * 6/1996 | Sprenger et al. ............. | 219/604 |
| 5,556,565 | 9/1996 | Kirkwood et al. . | |
| 5,571,436 | 11/1996 | Gregg et al. . | |
| 5,573,613 | 11/1996 | Lunden . | |
| 5,624,594 | 4/1997 | Matsen et al. . | |
| 5,635,094 | 6/1997 | Hansen et al. . | |
| 5,641,422 | 6/1997 | Matsen et al. . | |
| 5,645,744 | 7/1997 | Matsen et al. . | |
| 5,660,669 | 8/1997 | Mittleider . | |
| 5,686,038 | 11/1997 | Christensen et al. . | |
| 5,688,426 | 11/1997 | Kirkwood et al. . | |
| 5,690,851 | * 11/1997 | Yoshioka et al. ............. | 219/635 |
| 5,705,795 | 1/1998 | Anderson et al. . | |
| 5,705,796 | 1/1998 | Hansen et al. . | |
| 5,709,893 | 1/1998 | McCarville et al. . | |
| 5,710,412 | 1/1998 | Hansen . | |
| 5,710,414 | 1/1998 | Matsen et al. . | |
| 5,717,191 | 2/1998 | Christensen et al. . | |

(List continued on next page.)

*Primary Examiner*—Tu Ba Hoang
(74) *Attorney, Agent, or Firm*—Harness, Dickey & Pierce, P.L.C.

(57) ABSTRACT

A static coil induction welding apparatus and method for induction welding thermoplastic composite structures. The apparatus includes a plurality of independent coil segments disposed adjacent one another in side-by-side fashion to form a coil pack. A plurality of such coil packs are disposed in side-by-side fashion to form a coil assembly which covers the entire area of the weld zone. An AC power supply associated with each coil pack applies an AC signal through a switching network to electrically energize its associated coil segments such that the AC signals are in predetermined phase relationships relative to one another, thus generating a plurality of eddy current loops in a susceptor placed between the components being welded. The switching network alternately switches the coil segments such that the AC signals applied to the coil segments are shifted back and forth between adjacently disposed coil segments repeatedly approximately every 0.5 seconds. This produces a back and forth lateral shifting of the induced eddy current loops by about one-half the width of one current loop to provide uniform heating of the susceptor. It also eliminates various drawbacks associated with dynamic coil induction welding systems, allows feedback control over the power applied to each coil pack, and produces welds of even more consistent and higher quality than can be achieved with previously developed dynamic coil systems.

25 Claims, 7 Drawing Sheets

U.S. PATENT DOCUMENTS

| | | |
|---|---|---|
| 5,723,849 | 3/1998 | Matsen et al. . |
| 5,728,309 | 3/1998 | Matsen et al. . |
| 5,753,068 | 5/1998 | Mittleider . |
| 5,756,973 | 5/1998 | Kirkwood et al. . |
| 5,760,379 | 6/1998 | Matsen et al. . |
| 5,786,575 * | 7/1998 | Bleske et al. ............... 219/633 |
| 5,786,576 | 7/1998 | Lunden . |
| 5,793,024 | 8/1998 | Matsen et al. . |
| 5,808,281 | 9/1998 | Matsen et al. . |
| 5,829,716 | 11/1998 | Kirkwood et al. . |
| 5,833,799 | 11/1998 | Mittleider . |
| 5,847,375 | 12/1998 | Matsen et al. . |
| 5,863,635 | 1/1999 | Childress . |
| 5,869,814 | 2/1999 | Scoles . |
| 5,876,540 | 3/1999 | Pannell . |
| 5,876,832 | 3/1999 | Pannell . |
| 5,902,935 | 5/1999 | Georgeson et al. . |
| 5,916,469 | 6/1999 | Scoles et al. . |
| 5,925,277 | 7/1999 | Scoles . |
| 5,934,618 | 8/1999 | Kari et al. . |
| 5,935,475 | 8/1999 | Scoles et al. . |
| 5,935,698 | 8/1999 | Pannell . |
| 5,968,639 | 10/1999 | Childress . |
| 5,980,665 | 11/1999 | Childress . |

\* cited by examiner

STATIC COIL APPARATUS AND METHOD FOR WELDING THERMOPLASTIC COMPOSITE STRUCTURES

TECHNICAL FIELD

The present invention relates to welding systems for welding thermoplastic composite structures, and more particularly to a static coil apparatus and method for induction welding thermoplastic structures.

BACKGROUND OF THE INVENTION

Background Art
1. Composite Manufacturing

Fiber-reinforced organic resin matrix composites have a high strength-to-weight ratio or a high stiffness-to-weight ratio and desirable fatigue characteristics that make them increasingly popular as a replacement for metal in aerospace applications where weight, strength, or fatigue is critical. Organic resin composites, be they thermoplastics or thermosets, are expensive today. Improved manufacturing processes would reduce touch labor and forming time.

Prepregs combine continuous, woven, or chopped reinforcing fibers with an uncured, matrix resin, and usually comprise fiber sheets with a thin film of the matrix. Sheets of prepreg generally are placed (laid-up) by hand or with fiber placement machines directly upon a tool or die having a forming surface contoured to the desired shape of the completed part or are laid-up in a flat sheet which is then draped and formed over the tool or die to the contour of the tool. Then the resin in the prepreg lay up is consolidated (i.e. pressed to remove any air, gas, or vapor) and cured (i.e., chemically converted to its final form usually through chain-extension) in a vacuum bag process in an autoclave (i.e., a pressure oven) to complete the part.

The tools or dies for composite processing typically are formed to close dimensional tolerances. They are massive, must be heated along with the workpiece, and must be cooled prior to removing the completed part. The delay caused to heat and to cool the mass of the tools adds substantially to the overall time necessary to fabricate each part. These delays are especially significant when the manufacturing run is low rate where the dies need to be changed frequently, often after producing only a few parts of each kind. An autoclave has similar limitations; it is a batch operation.

In hot press forming, the prepreg is laid-up to create a preform, which is bagged (if necessary), and placed between matched metal tools that include forming surfaces to define the internal, external, or both mold lines of the completed part. The tools and composite preform are placed within a press and then the tools, press, and preform are heated.

The tooling in autoclave or hot press fabrication is a significant heat sink that consumes substantial energy. Furthermore, the tooling takes significant time to heat the composite material to its consolidation temperature and, after curing the composite, to cool to a temperature at which it is safe to remove the finished composite part.

As described in U.S. Pat. No. 4,657,717, a flat composite prepreg panel was sandwiched between two metal sheets made from a superplastically formable alloy and then formed against a die having a surface precisely contoured to the final shape of the part.

Attempts have been made to reduce composite fabrication times by actively cooling the tools after forming the composite part. These attempts have shortened the time necessary to produce a composite part, but the cycle time for and cost of heating and cooling remain significant contributors to overall fabrication costs. Designing and making tools to permit their active cooling increases their cost.

Boeing described a process for organic matrix forming and consolidation using induction heating in U.S. Pat. No. 5,530,227. There, prepregs were laid up in a flat sheet and were sandwiched between aluminum susceptor facesheets. The facesheets were susceptible to heating by induction and formed a retort to enclose the prepreg preform. To ensure an inert atmosphere around the composite during curing and to permit withdrawing volatiles and outgassing from around the composite during the consolidation, the facesheets were welded around their periphery. However, such welding unduly impacts the preparation time and the cost for part fabrication. It also ruined the facesheets (i.e., prohibited their reuse which added a significant cost penalty to each part fabricated with this approach). Boeing also described in U.S. Pat. No. 5,599,472 a technique that readily and reliably seals facesheets of the retort without the need for welding and permits reuse of the facesheets in certain circumstances. This "bag-and-seal" technique applies to both resin composite and metal processing.

2. Processing in an Induction Press

The dies or tooling for induction processing are ceramic because a ceramic is not susceptible to induction heating and, preferably, is a thermal insulator (i.e., a relatively poor conductor of heat). Cast ceramic tooling is strengthened and reinforced internally, with fiberglass rods or other appropriate reinforcements and externally with metal or other durable strongbacks to permit it to withstand the temperatures and pressures necessary to form, to consolidate, or otherwise to process the composite materials or metals. Cast ceramic tools cost less to fabricate than metal tools of comparable size and have less thermal mass than metal tooling, because they are unaffected by the induction field. Because the ceramic tooling is not susceptible to induction heating, it is possible to embed induction heating elements in the ceramic tooling and to heat the composite or metal retort without significantly heating the tools. The induction heating elements themselves connect to form a water cooling network. Thus, induction heating can reduce the time required and energy consumed to fabricate a part.

While graphite or boron fibers can be heated directly by induction, most organic matrix composites require a susceptor in or adjacent to the composite material preform to achieve the necessary heating for consolidation or forming. The susceptor is heated inductively and transfers its heat principally through conduction to the preform or workpiece that, in Boeing's prior work, is sealed within the susceptor retort. Enclosed in the metal retort, the workpiece does not experience the oscillating magnetic field which instead is absorbed in the retort sheets. Heating is by conduction from the retort to the workpiece.

Induction focuses heating on the retort (and workpiece) and eliminates wasteful, inefficient heat sinks. Because the ceramic tools in Boeing's induction heating workcell do not heat to as high a temperature as the metal tooling of conventional, prior art presses, problems caused by different coefficients of thermal expansion between the tools and the workpiece are reduced. Furthermore, this process is energy efficient because significantly higher percentages of the input energy go to heating the workpiece than occurs with conventional presses. The reduced thermal mass and ability to focus the heating energy permits the operating temperature to be changed rapidly which improves the products produced by Boeing's workcell. Finally, the shop environment is not heated as significantly from the radiation of the large thermal mass of a conventional press, and is a safer and more pleasant environment for the press operators.

In induction heating for consolidating and/or forming organic matrix composite materials, Boeing has placed a thermoplastic organic matrix composite preform of PEEK or ULTEM, for example, within a metal susceptor envelope (i.e., retort). These thermoplastics have a low concentration of residual volatile solvents and are easy to use. The susceptor facesheets of the retort are inductively heated to heat the preform. A consolidation and forming pressure is applied to consolidate and, if applicable, to form the preform at its curing temperature. The sealed susceptor sheets form a pressure zone. The pressure zone is evacuated in the retort in a manner analogous to conventional vacuum bag processes for resin consolidation or, for low volatiles resins, like ULTEM, this zone can be pressurized to enhance consolidation. The retort is placed in an induction heating press on the forming surfaces of dies having the desired shape of the molded composite part. After the retort (and preform) are inductively heated to the desired elevated temperature, a differential pressure is applied (while maintaining the vacuum in the pressure zone around the preform) across the retort. The retort functions as a diaphragm in the press to form the preform against the die into the desired shape of the completed composite panel.

The retort often includes three susceptor sheets sealed around their periphery to define two pressure zones. The first pressure zone surrounds the composite panel/preform or metal workpiece and is evacuated and maintained under vacuum. The second pressure zone is pressurized (i.e., flooded with gas) at the appropriate time and rate to help form the composite panel or workpiece. The shared wall of the three layer sandwich that defines the two pressure zones acts as a diaphragm in this situation.

Boeing can perform a wide range of manufacturing operations in its induction heating press. These operations have optimum operating temperatures ranging from about 350° F. (175° C.) to about 1950° F. (1066° C.). For each operation, the temperature usually needs to be held relatively constant for several minutes to several hours while the operations are completed. While temperature control can be achieved by controlling the input power fed to the induction coil, Boeing has discovered a better and simpler way that capitalizes on the Curie temperature. By judicious selection of the metal or alloy in the retort's susceptor facesheets, excessive heating can be avoided irrespective of the input power. With improved control and improved temperature uniformity in the workpiece, better products can be produced. Boeing's method capitalizes on the Curie temperature phenomenon to control the absolute temperature of the workpiece and to obtain substantial thermal uniformity in the workpiece, by matching the Curie temperature of the susceptor to the desired temperature of the induction heating operation being performed. This temperature control method is explained in greater detail in Boeing's U.S. Pat. No. 5,728,309 which is incorporated by reference.

3. Thermoplastic Welding

Three major joining technologies exist for aerospace composite structure: mechanical fastening; adhesive bonding; and welding. Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding often requires complicated surface pretreatments.

In contrast, thermoplastic welding, which eliminates fasteners, features the ability to join thermoplastic composite components at high speeds with minimum touch labor and little, if any, pretreatments. In Boeing's experience, the welding interlayer (comprising the susceptor and surrounding thermoplastic resin either coating the susceptor or sandwiching it) also can simultaneously take the place of shims required in mechanical fastening. As such, composite welding holds promise to be an affordable joining process. For "welding" thermoplastic and thermoset composite parts together, the resin that the susceptor melts functions as a hot melt adhesive. If fully realized, the thermoplastic-thermoset bonding will further reduce the cost of composite assembly.

There is a large stake in developing a successful induction welding process. Its advantages versus traditional composite joining methods are:

reduced parts count versus fasteners minimal surface preparation, in most cases a simple solvent wipe to remove surface contaminants indefinite shelf life at room temperature short process cycle time, typically measured in minutes enhanced joint performance, especially hot/wet and fatigue permits rapid field repair of composites or other structures.

There is little or no loss of bond strength after prolonged exposure to environmental influences.

U.S. Pat. No. 4,673,450 describes a method to spot weld graphite fiber reinforced PEEK composites using a pair of electrodes After roughening the surfaces of the prefabricated PEEK composites in the region of the bond, Burke placed a PEEK adhesive ply along the bond line, applied a pressure of about 50–100 psi through the electrodes, and heated the embedded graphite fibers by applying a voltage in the range of 20–40 volts at 30–40 amps for approximately 5–10 seconds with the electrodes. Access to both sides of the assembly is required in this process which limits its application.

Prior art disclosing thermoplastic welding with induction heating is illustrated by U.S. Pat. Nos. 3,966,402 and 4,120,712. The metallic susceptors are of a conventional type having a regular pattern of openings of traditional manufacture. Achieving a uniform, controllable temperature in the bondline, which is crucial to preparing a thermoplastic weld of adequate integrity to permit use of welding in aerospace primary structure, is difficult with those conventional susceptors, as was discussed and illustrated in U.S. Pat. No. 5,500,511.

Thermoplastic welding is a process for forming a fusion bond between two faying thermoplastic faces of two parts. A fusion bond is created when the thermoplastic on the surface of the two thermoplastic composite parts is heated to the melting or softening point and the two surfaces are brought into contact, so that the molten thermoplastic mixes, and the surfaces are held in contact while the thermoplastic cools below the softening temperature.

Simple as the thermoplastic welding process sounds, and easy as it is to perform in the laboratory on small pieces, it becomes difficult to perform reliably and repeatably in a real factory on full-scale parts to build a large structure such as an airplane wing box. The difficulty is in getting the proper amount of heat to the bondline without overheating the entire structure. Considerable difficulty can also be encountered in achieving intimate contact of the faying surfaces of the two parts at the bondline during heating and cooling despite the normal imperfections in the flatness of composite parts, thermal expansion of the thermoplastic during heating to the softening or melting temperature, flow of the thermoplastic out of the bondline under pressure (i.e., squeeze out), and then contraction of the thermoplastic in the bondline during cooling. The exponential decay of the strength of magnetic fields dictates that, in induction welding processes, the susceptible structure closest to the induction coil will be the hottest, since it experiences the strongest field. Therefore, it is difficult to obtain adequate heating at the bond line between two graphite or carbon fiber reinforced resin matrix composites relying on the susceptibility of the fibers alone as the source of heating in the assembly. For the inner plies to be hot enough to melt the resin, the outer plies closer to the induction coil and in the stronger magnetic field are too hot. The matrix resin in the entire piece of composite melts. The overheating results in porosity in the product, delamination, and, in some case, destruction or denaturing of the resin. To avoid overheating of the outer plies and to insure adequate heating of the inner plies, Boeing uses a susceptor of significantly higher conductivity than the fibers to peak the heating selectively at the bondline. An electromagnetic induction coil heats a susceptor to melt and cure a thermoplastic resin (also sometimes referred to as an adhesive) to bond the elements of the assembly together.

The current density in the susceptor may be higher at the edges of the susceptor than in the center because of the nonlinearity of the coil, such as occurs when using a cup core induction coil like that described in U.S. Pat. No. 5,313,037. Overheating the edges of the assembly can result in underheating the center, with either condition leading to inferior welds because of non-uniform curing. It is necessary to have an open or mesh pattern in the susceptor embedded at the bondline to allow the resin to create the fusion bond between the composite elements of the assembly when the resin heats and melts.

a. Moving Coil Welding Processes

In U.S. Pat. No. 5,500,511, Boeing described a tailored susceptor for approaching the desired temperature uniformity. This susceptor, designed for use with the cup coil of U.S. Pat. No. 5,313,037, relied upon carefully controlling the geometry of openings in the susceptor (both their orientation and their spacing) to distribute the heat evenly. The use of a regular array of anisotropic, diamond shaped openings with a ratio of the length (L) to the width (W) greater than 1 was suggested to provide a superior weld by producing a more uniform temperature than that obtainable by using a susceptor having a similar array, but one where the L/W ratio was one. By changing the length to width ratio (the aspect ratio) of the diamond-shaped openings in the susceptor, a large difference in the longitudinal and transverse conductivity in the susceptor was achieved, which thereby tailored the current density within the susceptor. A tailored susceptor having openings with a length (L) to width (W) ratio of 2:1 has a longitudinal conductivity about four times the transverse conductivity. In addition to tailoring the shape of the openings to tailor the susceptor, the current density was altered in regions near the edges by increasing the foil density (i.e., the absolute amount of metal). Increasing the foil density along the edge of the susceptor increases the conductivity along the edge and reduces the current density and the edge heating. Foil density was increased by folding the susceptor to form edge strips of double thickness or by compressing openings near the edge of an otherwise uniform susceptor. Boeing found these susceptors difficult to reproduce reliably. Also, their use forced careful placement and alignment to achieve the desired effect.

The tailored susceptor was designed to be used with the cup coil of U.S. Pat. No. 5,313,037, where the magnetic field is strongest near the edges because the central pole creates a null at the center. Therefore, the tailored susceptor was designed to counter the higher field at the edges by accommodating the induced current near the edges. The high longitudinal conductivity encouraged induced currents to flow longitudinally.

Boeing's salvaged susceptor for thermoplastic welding, which is described in U.S. Pat. No. 5,508,496, controls the current density pattern during eddy current heating by an induction coil to provide substantially uniform heating to a composite assembly and to insure the strength and integrity of the weld in the completed part. This susceptor is particularly desirable for welding ribs between prior welded spars using an asymmetric induction coil (described in U.S. Pat. No. 5,444,220, which is incorporated by reference herein), because, with that coil, it provides a controllable area of intense, uniform heating, a trailing region with essentially no heating, and a leading region with minor preheating.

The power (P) [or power density] which the susceptor dissipates as heat follows the well-known equation for power loss in a resistor: $P=(J^2)(R)$ wherein J is the eddy current (or its density) and R is the impedance (i.e., resistance) of any segment of the eddy path. The heating achieved directly corresponds to the power (or power density).

We achieve better performance (i.e., more uniform heating) in rib welding by using a salvaged susceptor having edge strips without openings. The resulting susceptor, then, has a center portion with a regular pattern of opening and solid foil edges, which Boeing refers to as salvage edge strips. The susceptor is embedded in a thermoplastic resin to make a susceptor/resin tape that is easy to handle and to use in preforming the composite pieces prior to welding. Also, it has been discovered that, with a salvaged susceptor, the impedance of the central portion should be anisotropic with a lower transverse impedance than the longitudinal impedance. Here, the L/W ratio of diamond shaped openings should be less than or equal to one. That is, unlike Boeing's tailored susceptor of U.S. Pat. No. 5,500,511, "L" for the salvaged susceptor should be less than "W". With this new salvaged susceptor in the region immediately under the asymmetric induction work coil, current is encouraged to flow across the susceptor to the edges where the current density is lowest and the conductivity, highest.

Generally, Boeing forms the salvaged susceptor somewhat wider than normal so that the salvage edge strips are not in the bondline. The salvage edge strips are removed after forming the weld, leaving only a perforated susceptor foil in the weld. This foil has a relatively high open area fraction.

Significant effort has been expended in developing inductor and susceptor systems to optimize the heating of the bondline in thermoplastic assemblies. Induction coil structures and tailored susceptors have now been developed that provide adequate control and uniformity of heating of the bondline. However, a big hurdle that remains to perfecting the process to the point of practical utility for producing large scale aerospace-quality structures in a production environment is the aspect of the process dealing with the control of the surface contact of the faying surfaces of the two parts to be welded together. Additional important factors are the timing, intensity, and schedule of heat application so the material at the faying surfaces is brought to and maintained within the proper temperature range for the requisite amount of time for an adequate bond to form, and is maintained in intimate contact while the melted or softened material hardens in its bonded condition.

Large scale parts such as wing spars and ribs, and the wing skins that are bonded to the spars and ribs, are typically on the order of 20–30 feet long at present, and potentially can be hundreds of feet in length when the process is perfected for commercial transport aircraft. Parts of this magnitude are difficult to produce with perfect flatness. Instead, the typical part will have various combinations of surface deviations from perfect flatness, including large scale waviness in the direction of the major length dimension, twist about the longitudinal axis, dishing or sagging of "I" beam flanges, and small scale surface defects such as aspirates and depressions. These irregularities interfere with full surface area contact between the faying surfaces of the two parts and actually result in surface contact only at a few "high points" across the intended bondline. Additional surface contact can be achieved by applying pressure to the parts to force the faying surfaces into contact, but full intimate contact is difficult or impossible to achieve in this way. Applying heat to the interface by electrically heating the susceptor in connection with pressure on the parts tends to flatten the irregularities further, but the time needed to achieve full intimate contact with the use of heat and pressure is excessive, can result in deformation of the top part, and tends to raise the overall temperature of the "I" beam flanges to the softening point, so they begin to yield or sag under the application of the pressure needed to achieve a good bond.

Boeing's multipass thermoplastic welding process described in U.S. Pat. No. 5,486,684 enables a moving coil welding process to produce continuous or nearly continuous fusion bonds over the full area of the bondline to yield very high strength welds reliably, repeatably and with consistent quality. This process produces improved low cost, high strength composite assemblies of large scale parts fusion bonded together with consistent quality. It also uses a schedule of heat application that maintains the overall temperature of the structure within the limit in which it retains its high strength, so it requires no internal tooling to support the structure against sagging which otherwise could occur above the high strength temperature limit. The process produces nearly complete bondline area fusion on standard production composite material parts having the usual surface imperfections and deviations from perfect flatness. Furthermore, it eliminates fasteners and the expense of drilling holes, inspecting the holes and the fasteners, inspecting the fasteners after installation, sealing between the parts and around the fastener and the hole, reducing mismatch of materials and eliminating arcing from the fasteners.

In the process, an induction heating work coil is passed multiple times over a bondline while applying pressure in the region of the coil to the components to be welded, and maintaining the pressure until the resin hardens. The resin at the bondline is heated to the softening or melting temperature with each pass of the induction work coil. Pressure is also exerted to flow the softened/melted resin in the bondline and reduce the thickness of the bondline while improving the intimacy of the faying surface contact with each pass to militate for complete continuity of bond. The total time at the softened or melted condition of the thermoplastic in the faying surfaces is sufficient to attain deep interdiffusion of the polymer chains in the materials of the two faying surfaces throughout the entire length and area of the bondline. This produces a bondline of improved strength and integrity in the completed part, but the total time of the faying surfaces at softened temperature is in separate time segments. This allows time for the heat in the interface to dissipate without raising the temperature of the entire structure to the degree at which it loses its strength and begins to sag. In this manner the desired shape and size of the final assembly is maintained.

A structural susceptor allows Boeing to include fiber reinforcement within the weld resin to alleviate residual tensile strain otherwise present in an unreinforced weld. The susceptor includes alternating layers of thin film thermoplastic resin sheets and fiber reinforcement (usually woven fiberglass fiber) sandwiching the conventional metal susceptor that is embedded in the resin. While the number of total plies in this structural susceptor is usually not critical, Boeing prefers to use at least two plies of fiber reinforcement on each side of the susceptor. This structural susceptor is described in greater detail in Boeing's U.S. Pat. No. 5,717,191, which is incorporated by reference.

The structural susceptor permits gap filling between the welded composite laminates. This effectively tailors the thickness (number of plies) in the structural susceptor to fill the gaps, thereby eliminating costly profilometry of the faying surfaces and the inherent associated problem of resin depletion at the faying surfaces caused by machining the surfaces to have complementary contours. Standard manufacturing tolerances produce gaps as large as 0.120 inch, which is too wide to create a quality weld using the conventional susceptors.

Boeing can easily tailor the thickness of the structural susceptor to match the measured gap by scoring through the appropriate number of plies of resin and fiber reinforcement and peeling them off. In doing so, a resin side layer will be on both faying surfaces and this layer should insure better performance from the weld.

b. Fixed Coil Induction Welding

Boeing has also experimented with thermoplastic welding using its induction heating workcell and, of course, discovered that the process differs from the moving coil processes because of the coil design and resulting magnetic field. It is believed that Boeing's fixed coil workcell presents promise for welding at faster cycle times than the moving coil processes because multiple susceptors can be heated simultaneously. The keys to the process, however, are achieving controllable temperatures at the bondline in a reliable and reproducible process that assure quality welds of high bond strength. Boeing's fixed coil induces currents to flow in the susceptor differently from the moving coils and covers a larger area. Nevertheless, processing parameters have been developed that permit welding with Boeing's induction heating workcell using a susceptor at the bondline. These processes are described in Boeing's U.S. Pat. Nos. 5,641,422 and 5,723,849.

Another advantage with the fixed coil process is that welding can occur using the same tooling and processing equipment that is used to consolidate the skin, thereby greatly reducing tooling costs. Finally, the fixed coil heats the entire bondline at one time to eliminate the need for shims or profile matching machining that are currently used with the moving coil. Boeing's fixed coil process controls the temperature and protects against overheating by using "smart" susceptors as a retort or as the bondline susceptor material or both. U.S. Pat. Nos. 5,808,281 or 5,728,309.

c. Induction Welding Large Component Parts

In spite of the advances made by Boeing with regard to fixed coil thermoplastic welding workcells, such presently available fixed coil workcells are generally unsuited to accommodating large sections of skin panels and spars. The dies and other tooling that would be needed to accommodate wing skins and spars, as well as other large aerospace structures having lengths on the order of ten feet or longer, would make such tooling expensive and difficult to manage.

It is difficult with presently available fixed coil thermoplastic welding workcells to obtain highly accurate, localized control over the heat applied (via the susceptor) to small areas of the components being welded (i.e., uniform heating to the desired temperature). As described earlier, long sections of wing skins and spars are usually not perfectly flat, and usually suffer from minor surface imperfections or irregularities. With present fixed coil systems, when such components are brought into contact with the susceptor, the heating of the surfaces of the components being welded can vary because of these surface imperfections. At those small areas of the components where good surface contact is not made with the susceptor, insufficient heating of the component may result. To ensure contact, profiling of the faying surface is possible but is an expensive process that is unsuited to production at appreciable rates. This limitation also makes it quite difficult for fixed coil systems to thoroughly bond components having varying thicknesses along their lengths.

Moving coil systems currently available also have trouble providing highly precise, localized temperature control over large components being welded. With moving coil systems, it is generally even more difficult to control precisely the temperature of the weld zone sufficiently to compensate for surface imperfections. The coil is constantly moving (albeit slowly), while heating small sections of the components, one at a time. In effect, small sections of the components being welded are heated up and begin cooling again, as the coil continues to move, such that it is difficult to control the coil so that it spends sufficient time at any one spot to allow the temperature to be precisely regulated. It is also difficult to maintain the desired pressure along the weld line while using a moving coil system. Accordingly, existing moving coil processes are even less suited than fixed coil process to allow for using temperature feedback control devices to monitor and provide precise adjustments to the coil to alter the temperature of the weld zone slightly, as needed, to provide precise temperature control over the entire area of the components being welded.

SUMMARY OF THE INVENTION

The present invention preferably provides a static coil induction welding apparatus and method for enabling thermoplastic composite structures to be welded even more efficiently and effectively via a fixed (i.e., non-moving) coil.

In a preferred embodiment the present invention also provides a static coil apparatus and method for welding thermoplastic composite structures in which the static coil apparatus can be configured to a desired length to allow large scale parts, such as wing spars and aircraft skins having lengths of 20–30 feet or more, to be joined along the entire weld zone at one time. Doing so likely significantly reduces the overall time required for induction welding large thermoplastic composite structures, and enables the use of a temperature feedback control device/system for monitoring the overall temperature of the weld zone and providing temperature information concerning the weld zone temperature to a controller. This feedback control ensures that the temperature of the weld zone is precisely controlled. Accordingly, complete bonding and quality welds along the entire weld zone can be obtained.

In one preferred embodiment, the static coil induction welding apparatus of the present invention comprises a plurality of independent coil segments arranged side-by-side to form at least one coil pack complementary to the intended bond line. The coil pack is generally disposed against, or very closely adjacent to, the surface of one of the two components being joined and preferably supports one of the components. The coil assembly should be positioned as close to the bond line as possible to reduce the effect of attenuation of the magnetic induction field with distance. If possible, the structure between the coil assembly and the susceptor along the bond line either should not be susceptible to heating by induction or should have a resonant induction heating frequency tuned sufficiently away from the frequency of the coil assembly. Otherwise, energy is lost to heat the structure rather than to flow heating along the bond line.

Each coil segment includes a plurality of windings and a ferromagnetic core. Each of the coil segments usually are electrically energized independently but simultaneously to produce adjacently disposed magnetic flux fields. Of course, other power schemes are possible. The flux fields induce a plurality of eddy current flows in a susceptor disposed closely adjacent the coil pack, and inbetween the two thermoplastic composite materials being joined, such that the susceptor can be heated over its entire area at one time and used to join the two components together. In part, temperature is controlled by controlling the direction of current flow in each coil segment.

In one preferred embodiment the apparatus includes a coil segment switching network which receives alternating current from an AC power supply and selectively couples the independent coil segments of the coil pack in series to produce an AC flow through each coil segment. The current flow in each coil segment has a desired phase relative to its adjacent coil segment. Supplying power in this manner causes the coil assembly to induce a plurality of adjacent eddy current loops in the susceptor. A switching network is used to selectively couple each coil segment to the power supply such that the phase of the AC signals applied to the coil segments is altered in a manner that causes the eddy current loops induced in the susceptor to shift laterally slightly. Switching back and forth is performed repeatedly so that the current loops induced in the susceptor are shifted laterally up and back along the susceptor preferably by approximately one-half the width of one current loop to produce a more even and uniform heating action over the entire area of the susceptor.

The static coil welding apparatus of the present invention, by heating the entire weld zone at one time, permits the temperature of the weld zone to be monitored and feedback control to be implemented easily to precisely control the temperature of the weld zone. In this manner, complete bonding of two components over the entire weld zone with quality welds can be accomplished. Repeatability of the process is also significantly improved.

BRIEF DESCRIPTION OF THE DRAWINGS

The various advantages of the present invention will become apparent to one skilled in the art by reading the following specification and subjoined claims and by referencing the following drawings in which:

FIG. 8 shows the coil assembly of FIG. 7 after the switching network has entered a second state of operation, thus causing the AC signals applied to each of the coil segments to be shifted to the left by one coil segment;

FIG. 9 is a simplified schematic view of the interconnections of the relays of the switching network that are connected to odd numbered coil packs of the coil assembly of FIG. 7, with the coil assembly in the first state of operation; and FIG. 10 is an illustration of the interconnections of the relays to the coil segments and the relative phase of the current signal applied to each coil segment of the odd numbered coil packs when the switching network is in the second state of operation.

DETAILED DESCRIPTION OF THE PREFERRED EMBODIMENTS

Figure 1:
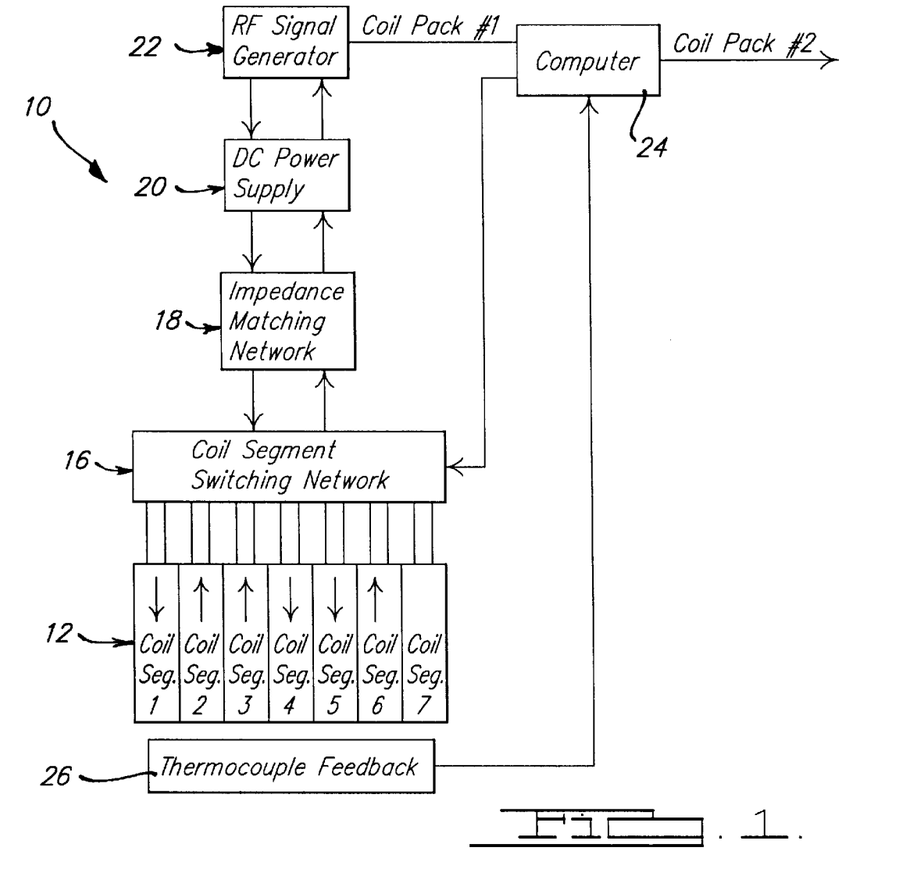
FIG. 1 is a simplified block diagram of a static coil welding apparatus in accordance with a preferred embodiment of the present invention.
Figures 3, 4:
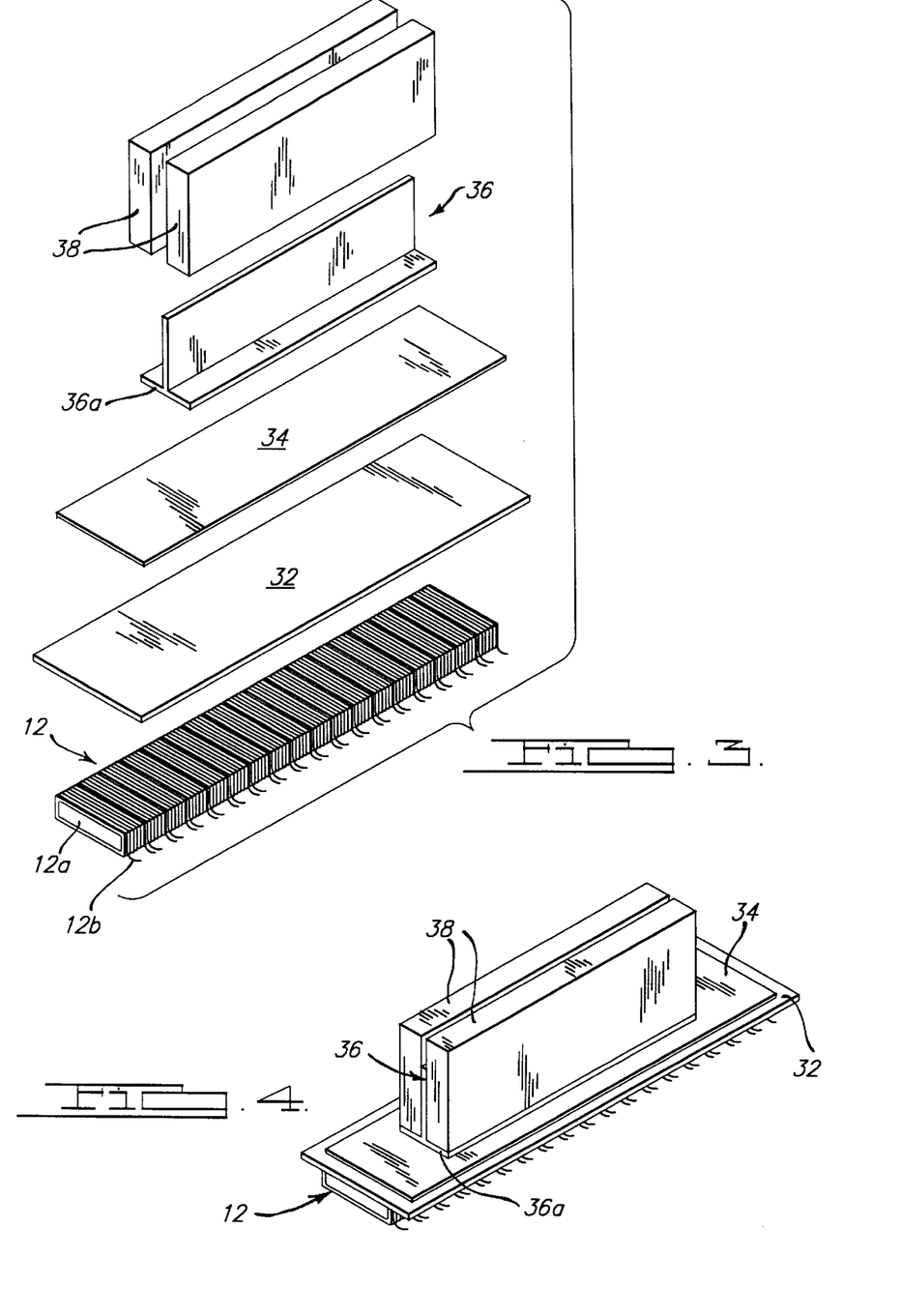
FIG. 3 is a simplified perspective view of a plurality of coil segments of the present invention together with portions of a skin, a susceptor, a spar and spar flange tooling.
FIG. 4 is a perspective view of the components shown in FIG. 3 illustrating how the coils segments are disposed on one side of the skin during the welding process.

FIG. 1 shows a static coil induction welding apparatus 10 in accordance with a preferred embodiment of the present invention. The apparatus 10 includes a plurality of independent coil segments 12 disposed adjacent one another in side-by-side fashion. For the purposes of discussion, six of the coil segments 12 can be viewed as a "coil pack" 14. Typically, more than one coil pack 14 will be employed, and a collection of coil packs 14 will be referred to as a "coil assembly". The coil pack 14 is disposed in direct contact with, or at least closely adjacent to, a surface of one component 32 (FIG. 3) of a pair of resin composite components 32 and 36 to be welded together. The two components are separated by a susceptor 34 and both are forced into intimate contact with the susceptor. FIG. 3 shows the components 32 and 36 are respectively a wing skin and a spar.

A coil segment switching network 16 interfaces each of the coil segments 12 with an impedance matching network 18. An alternating current (AC) power supply 20 applies an AC signal to the impedance matching network 18, which in turn transforms the inductive-resistive load of the coil segments 12 into an apparent 50 ohm load for the power supply 20. The switching network 16 also functions to couple the coil segments 12 in series, but in such a manner that the phase of the AC signal applied to each coil segment 12 has a desired relationship relative to the phase of the AC signal applied to its adjacent coil segment.

In practice, the power supply 20 and switching network 16 can be combined to form an integrated power supply system. The impedance matching network 18 essentially consists of a capacitor and a transformer. The capacitive reactance is used to cancel the inductive reactance of the coil segments 12, resulting in a purely resistive load. The transformer is preferably a multi-tapped transformer which steps this low resistance up to an apparent 50 ohms.

An RF signal generator 22 provides the RF signal which is amplified by the power supply 20. The RF signal generator 22, in one preferred form, comprises a Hewlett Packard 33120A signal generator with phase-lock loop. The amplitude of the output signal from the power supply 20 is controlled by a computer 24 to match a prescribed heat-up rate. Optionally, a thermocouple 26 may be disposed closely adjacent to the weld zone and used to provide a feedback signal to the computer 24 to precisely control the power applied to the coil segments 12 during the welding process.

Each coil pack 14 (comprising six independent coil segments 12) includes in this embodiment its own RF signal generator 22, DC power supply 20, impedance matching network 18, and switching network 16. Each of the coil packs 14, however, are controlled by their switching network 16, via computer 24, to achieve desired phase relationships in the AC signals applied to each of the coil segments 12.

Figure 2:
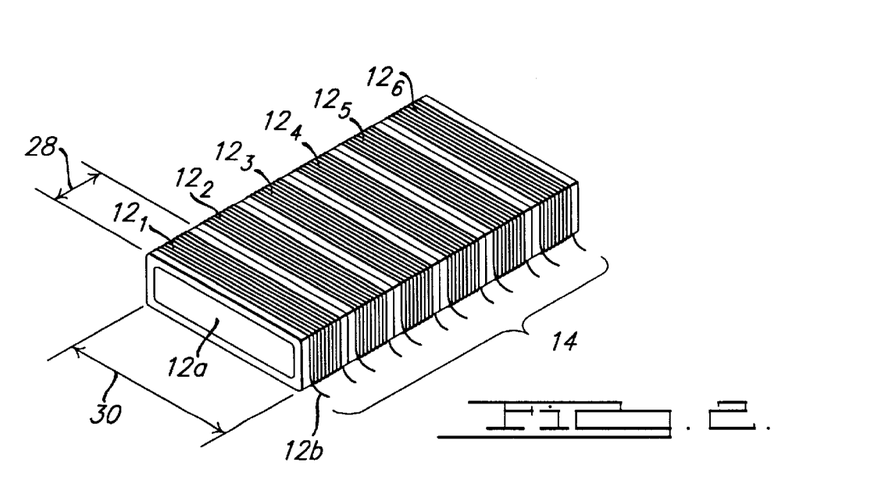
FIG. 2 is an enlarged perspective view of one coil pack of the present invention.

In FIG. 1 the arrows within each of the coil segments 12 are meant to provide a highly simplified representation of the phase of the AC signal applied to each coil segment 12 relative to its adjacent coil segment. The rightmost coil segment (i.e., coil segment $12_7$) does not include a current flow direction arrow. As will also be explained further in the following paragraphs, the switching network 16 operates to connect each of the coil segments 12 such that the AC signal applied thereto is "shifted" back and forth by one coil segment 12 during the welding process. Thus, the seventh coil segment $12_7$ shown in FIG. 2, in a first state of operation, is not energized by coil segment switching network 16. In a second state of operation, however, it does become part of the coil pack 14 and is controlled by the switching network 16, while the first coil segment $12_1$ is not energized.

Referring now to FIG. 3, one coil pack 14 is illustrated. Each coil segment 12 includes a ferromagnetic core $12a$ having a plurality of windings $12b$ of a conductor therearound. In one preferred form the conductor comprises ten strands of 23 AWG electrical wiring. The coil segments 12 may vary considerably in dimensions, but in one preferred form are approximately 1.25 inches (3.175 cm) in width, as indicated by dimensional arrows 28, and approximately 5.25 inches (13.335 cm) in length, as indicated by dimensional arrow 30. The overall length of each coil segment 12 and the number of coil packs 14 required for the welding of particular component parts will depend upon the dimensions of the component parts. At the present time, three coil packs 14 are sufficient to weld a 17.5 inch (44.45 cm) long spar. Boeing has used a coil assembly formed by seven coil packs 14 to weld a 47.5 inch (120.65 cm) long spar. While each coil pack 14 has been described as having six powered coil segments 12 at a time, a coil pack could readily be formed by a greater or lesser number of coil segments 12 to suit the needs of a particular welding application. Still further, the coil segments 12 could vary slightly in length and/or width to form a coil pack 14 having a non-rectangular shape if necessitated by the shape of the structures being welded.

Referring to FIGS. 3 and 4, 19 coil segments 12 are illustrated in relation to a portion of a skin 32, a susceptor 34, a spar 36 and spar flange tooling 38. As shown in FIG.

4, the susceptor 34 is interposed between the skin 32 and a cap 36a of the spar 36. The spar flange tooling 38 holds the spar 36, and particularly the spar cap 36a, firmly against the susceptor 34 during the welding process. The coil segments 12 are held against an outer surface 32a of the skin 32 by suitable tooling or a suitable fixture. The susceptor 36 may be integrated into the faying surface of one of the components (U.S. Pat. No. 5,916,469) or be encapsulated in a precured strip (U.S. Pat. No. 5,869,814).

In the present invention, the entire weld zone, as represented by the area of the susceptor 34, is preferably heated at one time rather than progressively in small segments as with dynamic (moving) coil induction welding systems. Since the entire spar cap 36a is welded to the skin 32 at one time, temperature feedback control can be easily implemented via the thermocouple feedback device 26 shown in FIG. 1. By using the thermocouple feedback device 26, the temperature of the weld zone can be more carefully controlled, thus insuring complete bonding of the spar cap 36a to the skin 34 over the entire weld zone.

Another important advantage of welding the entire weld zone simultaneously is that there is no requirement to bend the skin 32, which is quite stiff, to bring the skin 32 surface into intimate contact with the spar cap 36a. The coil packs 14 heat the entire weld zone at the same time to facilitate bringing the parts (36a and 32) into intimate contact. With the entire weld zone softened, the weld surfaces distort uniformly such that only viscous properties of the resin of the susceptor 34 need to be considered for allowing intimate contact, not the elastic properties. The increased ease in bringing the skin 32 into contact with the spar 36 also prevents "crowning" of the skin 32 around the spar cap 36a, which can occur with dynamic welding systems requiring very high pressures to be applied to the stiff, unheated skin during the welding processes. With dynamic coil induction welding systems, only a localized portion of the weld zone is softened at any given time during the welding process. Accordingly, a relatively large force must be applied to the skin 32 to deform the skin and gradually bring it into intimate contact with the spar cap 36a, if only a portion of the weld zone is hot. It is only when the parts are in intimate contact that the welding process can begin.

Yet another advantage is that the temperature of the parts during the welding process is more uniform and the parts spend an increased time at the optimum temperature range at which bonding occurs. In dynamic coil systems any particular area being welded spends a lesser amount of time at the actual temperature at which bonding takes place, unless the welding is done torturously slowly. The increased time at the bonding temperature has significantly improved the repeatability of the welding process when using the present invention.

Still another important advantage of the present invention is the highly precise, localized temperature control that can be exercised over the full area of the components being welded. Because an independent power supply 20 is used to supply an AC signal to the coil segments 12 of each coil pack 14 independently of the coil segments 12 of other coil packs 14, the AC signal to the coil segments 12 of each coil pack 14 can be closely controlled and the temperature of the weld zone closely monitored by the thermocouple 26. The thermocouple 26 provides a feedback signal which can be used to enable the power supply 20 to maintain the power applied to the coil segments 12 of each coil pack 14 at precisely that amount needed to achieve optimum heating of the components being welded, thus ensuring excellent quality welds. This feature also enables the power applied to the coil segments 12 of specific coil packs 14 to be varied independently of the power applied to other ones of the coil packs 14 if needed to accommodate varying thicknesses in the components being welded. It also allows the power applied to the coil packs 14 to be varied as needed to account for surface imperfections in the structures being welded that could otherwise affect the quality of the weld joint.

The present invention also reduces the overall time to complete a single weld. Since the coil segments 12 heat and maintain the entire weld zone simultaneously, the overall time required to weld two component parts is significantly reduced. For example, the total weld time for welding a spar having a length of about 52 inches (132 cm) is reduced from about 6–13 hours with a dynamic welding system to about 1–2 hours with the present invention.

Still further, the present invention allows the coil packs 14 to be specifically designed (i.e., shaped) to accommodate unique configurations of the parts being welded. This is a significant improvement over dynamic coil systems where the configuration of the dynamic coil being used cannot be readily modified to accommodate uniquely shaped parts. The use of the present invention further eliminates temperature variations in the weld zone that can result with dynamic coil welding systems as a result of coil "lift off" or unwanted side to side movement of the dynamic coil during the welding process.

Figure 5:
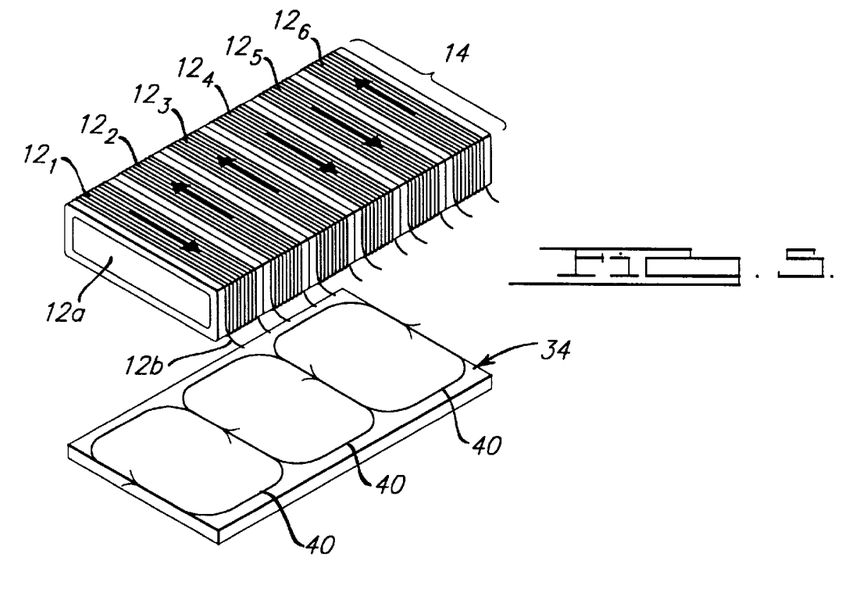
FIG. 5 is a simplified perspective view of one coil pack disposed over a portion of a susceptor illustrating in highly simplified fashion the eddy current loops induced in the susceptor as well as the relative phase of the current in each current loop, as a result of energization of the coil segments of the coil pack.
Figure 6:
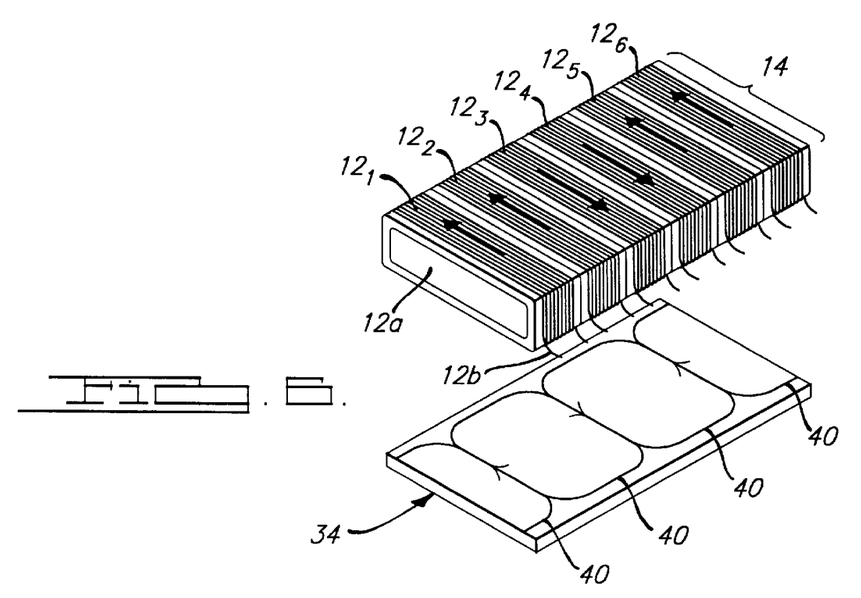
FIG. 6 is a simplified perspective view of the coil pack of FIG. 5 after the switching network has shifted the AC signals applied to selected ones of the coil segments such that the current loops generated in the susceptor are shifted laterally by approximately one-half the width of each current loop.

Referring to FIGS. 5 and 6, the eddy current loops 40 induced in the susceptor 34 as a result of electrically energizing each of the coil segments $12_1$–$12_6$ with an AC signal is illustrated. In FIG. 6, it can be seen that when the phase relationships of the AC signals are reversed (i.e., changed in phase by 180°), as represented in highly simplified form by the arrows on each side of the coil segments 12, the current loops 40 formed in the susceptor 34 are "shifted" laterally by approximately one-half the width of each current loop 40. In FIG. 6, the phase relationships of the AC signals applied to the coil segments 12 have been switched such that coil segments $12_1$–$12_5$ receive the AC signals that were formerly applied to coil segments $12_2$–$12_6$. Coil segment $12_6$ in FIG. 6 is now energized with an AC signal having a phase which is 180° shifted from the phase of the previously applied AC signal to this coil segment, as represented by the direction of the arrow shown within coil segment $12_6$. This "shift" of the AC signals by one coil segment 12 thus causes the lateral shifting of the eddy current loops 40 in the susceptor 34 and thus provides uniform heating of the susceptor 34 over its entire area, even without use of a "smart" susceptor.

Figure 7:
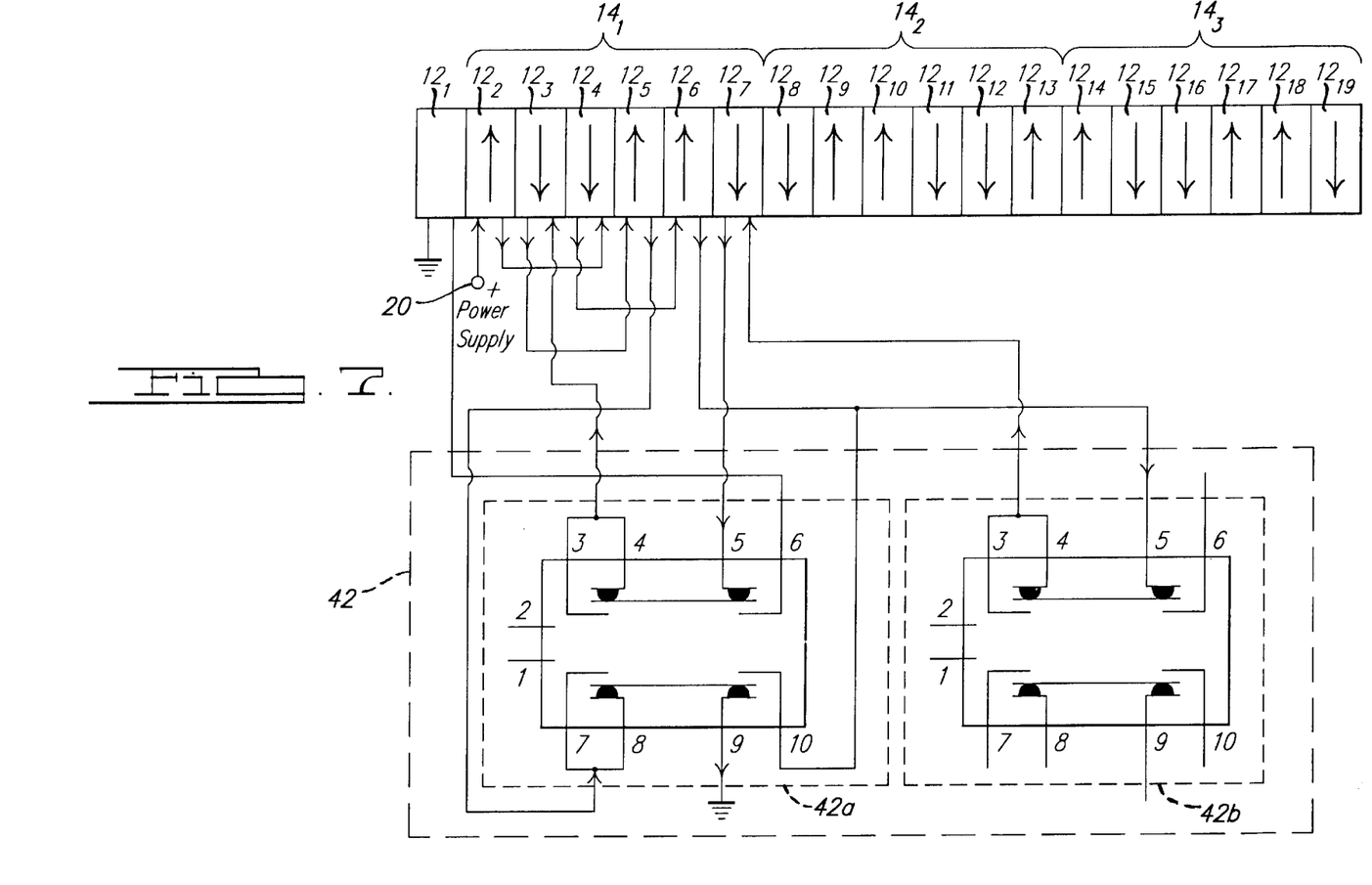
FIG. 7 is a simplified schematic diagram of a coil assembly having three coil packs disposed adjacent to one another, with the switching network used to couple power to odd numbered coil packs thereof during a first state of operation, and illustrating the phase of the AC signal applied to each coil segment and the connections made to the relays of the switching network during the first state of operation.
Figure 11:
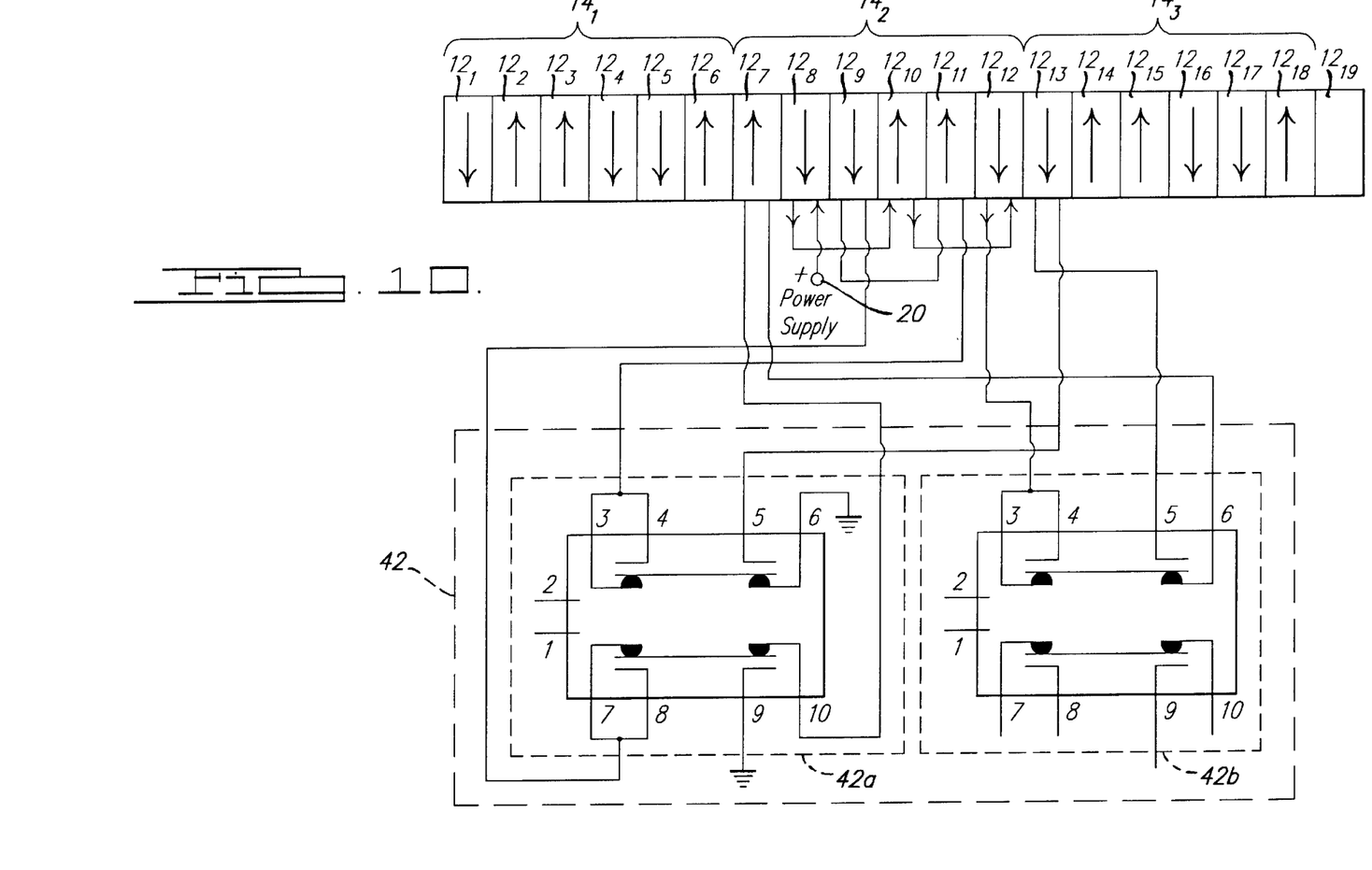

Referring now to FIGS. 7–10, the switching of the AC signals applied to the coil segments 12 will be described. FIG. 7 illustrates 19 coil segments $12_1$–$12_{19}$ of three independent coil packs $14_1$, $14_2$ and $14_3$. The coil packs $14$, $14_2$ and $14_3$ together form a coil assembly. Each coil pack 14 comprises six energized coil segments 12 at a given time. Thus, depending upon whether the apparatus 10 is in a first state or a second state of operation, one of the coil segments 12 will not be energized. In the first state of operation indicated in FIG. 7, the first coil segment $12_1$ is not energized. The phases of the AC signals applied to each of the other eighteen coil segments $12_2$–$12_{19}$ are indicated in highly simplified form by directional arrows meant to indicate the phase of each AC signal relative to the phase of the AC signal applied to the adjacent coil segment 12.

The switching network 16 of FIG. 1 is comprised of a relay assembly 42 coupled as shown to the coil segments 12 forming coil packs $14_1$ and $14_3$. For simplicity, only the connections to coil pack $14_1$ are illustrated. Coil pack $14_3$ would be connected in identical fashion to that shown for coil pack $14_1$ by a separate relay assembly 42. If more than three coil packs 14 are employed, then every other coil pack 14 (i.e., coil packs $14_1$, $14_3$, $14_5$, $14_7$, etc.) would be coupled by its own relay assembly 42 as shown for coil pack $14_1$. Other forms of switching components which are capable of being controlled electronically by an external controller, and of handling up to 15 amps or more of current could also be used.

FIG. 9 illustrates the relay assembly 42 coupled to coil pack $14_2$. If more than three coil packs 14 are incorporated, then alternating even numbered coil packs 14 are coupled as shown for coil pack $14_2$. For example, if eight coil packs 14 are employed, then a relay assembly 42 coupled as shown to coil pack $14_2$ would be coupled to each of coil packs $14_2$, $14_4$, $14_6$ and $14_8$.

Referring further to FIG. 7, the phase of each AC signal applied to each of coil segments $12_2$–$12_7$ is illustrated during the first state of operation. Relay 42a, through contacts 4 and 5, couples coil segments $12_3$ and $12_7$, while contacts 8 and 9 couple one side of coil segment $12_5$ to ground. Relay 42b, through its contacts 4 and 5, couples one side of coil segment $12_6$ to one side of coil segment $12_7$. The coil segments $12_2$–$12_7$ are thus all coupled in series but in such a manner that the phase relationship of the AC signals applied to the coil segments $12_2$–$12_7$ are in a desired orientation relative to each other. AC power is supplied to one side of coil segment $12_2$ by the power supply 20 (FIG. 1). It will be noted that coil segment $12_1$ is not energized during the first state of operation but coil segment $12_{19}$ is energized.

With brief reference again to FIG. 9, during the first state of operation the connections effected by the relay assembly 42 coupled to the second coil pack $14_2$ are shown. It will be noted that coil segment $12_7$ is not coupled through either relay 42a or 42b of the relay assembly 42 during state one operation. Thus, during the first state of operation, coil segment $12_7$ functions as one of the coil segments of coil pack $14_1$. Coil pack $14_2$ thus includes coil segments $12_8$–$12_{13}$, and coil pack $14_3$ includes coil segments $12_{14}$–$12_{19}$.

Referring now to FIGS. 8 and 10, during the second state of operation the connections to the coil segments 12 are modified such that coil segment $12_1$ is energized while coil segment $12_{19}$ is not energized. This change in the phase of each of the AC signals effectively "shifts" the phase of the AC signal applied to each coil segment 12 laterally by one coil segment 12 such that the AC signal formerly applied to coil segment $12_3$ is now applied to coil segment $12_2$, the AC signal formerly applied to coil segment $12_4$ is now applied to coil segment $12_3$, and so forth.

Referring specifically to FIG. 8, relay 42a, at contacts 3 and 6, couples one side of coil segment $12_1$ to one side of coil segment $12_3$. Contacts 7 and 9 of relay 42a couple one side of coil segment $12_5$ to one side of coil segment $12_6$. It will also be noted that coil segment $12_7$ is electrically decoupled at contact 5 of relay 42a and at contact 6 of relay 42b. Thus, in the second state of operation, the coil segment $12_7$ is not energized through relay assembly 42. Accordingly, in the second state of operation, coil pack $14_1$ is comprised of coil segments $12_1$–$12_6$, coil pack $14_2$ is comprised of coil segments $12_7$–$12_{12}$, and coil pack $14_3$ is comprised of coil segments $12_{13}$–$12_{18}$. Coil segment $12_{19}$ is not energized during the second state of operation.

With reference to FIG. 10, coil pack $14_2$ (comprising coil segments $12_7$–$12_{12}$) is coupled as shown to relay assembly 42. Power is supplied to one side of coil segment $12_8$. One side of coil segment $12_{11}$ is coupled via contacts 3 and 6 of relay 42a to ground. One side of coil segment $12_9$ is coupled via contacts 7 and 10 of relay 42a to one side of coil segment $12_7$. One side of coil segment $12_{12}$ is coupled via contacts 3 and 6 of relay 42b to one side of coil segment $12_7$. Thus, coil segment $12_7$ has become a part of coil pack $14_2$ during the second state of operation. Each of coil segments $12_7$–$12_{12}$ are further coupled in series. Coil segment $12_{13}$ is not energized by relay assembly 42 during the second state of operation but rather by the relay controlling coil pack $14_3$. Coil segment $12_{19}$ is also not energized during the second state of operation.

The computer 24 (FIG. 1) controls the coil segment switching network 16 associated with each power supply 20 such that the relays 42 switch between the first and second states of operation approximately every 0.5 seconds. This time period could obviously be varied if needed. By switching approximately every 0.5 seconds, a uniform heating of the overall weld zone can be achieved.

The static coil welding apparatus 10 and method of the present invention thus provides a means for welding thermoplastic composite structures together without the limitations traditionally associated with dynamic coil induction welding systems. The apparatus 10 further does not require the components being welded to be enclosed within any form of welding cell. The apparatus 10 provides much more uniform heating of the entire weld zone by heating the entire weld zone at one time. It also enables better feedback control over the temperature of the weld zone.

The apparatus 10 is also able to better effect welding to the very edges of the parts being welded. With dynamic coil welding systems, an additional "run off" region of the parts being welded has been required because of the inability of the dynamic coil system to weld directly to the ends of the parts being joined. Typically, this run off region represents an additional six inches in the length of the parts which had to be cut off after the dynamic welding process was completed. This resulted in additional waste of materials that the apparatus 10 avoids.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A static welding coil apparatus comprising:
   at least one coil segment having a predetermined length and width sufficient to cover at least a portion of a weld zone, and being positioned against only one surface of one of a pair of components to be welded;
   the coil segment having a ferromagnetic core element and an electrical conductor wound around said ferromagnetic core element;
   a power supply for supplying current to said electrical conductor to cause the coil segment to produce a magnetic field having a desired orientation within said portion of said weld zone; and
   wherein said magnetic field causes an eddy current to be generated within a susceptor placed between said pair of components and within said desired portion of said weld zone, said eddy current operating to heat said susceptor to enable said susceptor to join said pair of components.

2. The static welding coil apparatus of claim 1, further comprising:
   a plurality of said coil segments formed into at least one independent coil packs;
   each of said coil packs having an independent power supply; and
   a controller for controlling said power supplies such that a current applied to each said coil pack can be independently controlled to thereby independently control a strength of a magnetic field generated by each said coil pack, and thus a magnitude of each of the eddy currents induced in said susceptor by each said coil pack.

3. A static weld coil apparatus comprising:
   a plurality of independent coil segments disposed adjacent to one another to form a coil assembly having a predetermined length and width sufficient to cover at least a portion of a desired weld zone, and wherein the coil assembly is positioned entirely along only one surface of one of a pair of components to be welded;
   each of said coil segments having at least one winding and a core element; and
   a power supply for electrically energizing said coil assembly to thereby produce a plurality of adjacently disposed magnetic fields extending along said portion of said weld zone over which said coil assembly is disposed, said magnetic fields being operable to induce a plurality of eddy current in a susceptor disposed in said weld zone inbetween said pair of components, to thus heat the susceptor and effect welding of said pair of components.

4. The welding coil apparatus of claim 3, wherein a plurality of said coil assemblies are disposed adjacent one another in side-by-side fashion, and entirely along only said one surface of said one of said pair of components to be welded, to substantially cover an entire area of said weld zone;
   wherein each of said coil assemblies includes an independent power supply; and
   wherein said power supplies independently control the application of electrical power to each of said coil assemblies to enable said coil assemblies to produce magnetic fields of at least slightly varying strengths along said weld zone, to thereby cause eddy currents of varying strength to be generated in said susceptor along the length of said susceptor.

5. The welding coil apparatus 4 further comprising:
   a controller for controlling each of said power supplies and causing said power supplies to periodically alter a current signal applied to each of said coil segments to cause said magnetic fields to be periodically shifted laterally back and forth along said weld zone, thus causing said eddy currents to be shifted laterally back and forth to provide generally uniform heating of said susceptor.

6. A static coil welding apparatus comprising:
   a plurality of independent coil segments disposed adjacent to one another to form a coil pack having a predetermined length and width sufficient to cover a desired weld zone;
   each said coil segment having at least one winding and a core element;
   a power supply system for generating a current signal for electrically energizing each of said coil segments of said coil pack; and
   a switching system for periodically switching said current signal between adjacent ones of said coil segments, to thereby cause magnetic fields produced by said coil segments to shift laterally periodically, producing overlapping magnetic fields to provide an overall magnetic field of uniform density over an entire area of said weld zone to provide for the uniform heating of the weld zone at one time.

7. The welding apparatus of claim 6, wherein the power supply system comprises a radio frequency (RF) signal generator.

8. The welding apparatus of claim 6, wherein said switching system switches the current signal applied to said coil segments approximately every 0.5 seconds to produce said laterally shifting magnetic fields.

9. The apparatus of claim 6, further comprising an impedance matching network coupled inbetween said coils and said power supply system.

10. The apparatus of claim 6, further comprising a susceptor, and wherein said coils cause a plurality of adjacent eddy current loops to be generated in said susceptor, said current loops shifting laterally back and forth periodically as the phase of the current signals through said coils is reversed.

11. A method for performing induction welding on a pair of thermoplastic composite components, comprising the steps of:
   disposing at least one fixed coil segment against only one surface of one of said pair of components to be welded together so as to overlay a portion of a weld zone;
   applying an electric current to said one coil segment to cause said one coil segment to generate a magnetic field within said portion of said weld zone;
   using the magnetic field to generate an eddy current in a susceptor disposed between said pair of components, to thereby heat said susceptor and enable said pair of components to be welded together.

12. The method of claim 11, further comprising the steps of:
   disposing a plurality of said fixed coil segments against said one surface of said one of said pair of components;
   grouping said fixed coil segments into a plurality of coil packs; and
   independently applying electric currents to each of said coil packs to cause said coil packs to generate a plurality of independent magnetic fields disposed adjacently one another within said portion of said weld zone.

13. The method of claim 12, further comprising the step of:
   independently controlling the electric current applied to each said coil pack to thereby control a strength of said magnetic field generated by each of said coil packs, and thereby control a magnitude of each said eddy current generated within said susceptor.

14. A static coil induction welding apparatus, comprising:
   a plurality of independent coil segments disposed adjacent one another to form a coil assembly having a predetermined length and width sufficient to substantially cover a desired weld zone, and adapted to be disposed against, or closely adjacent to, a surface of one of a pair of structures being joined, the segments capable of creating oscillating magnetic fields suitable for induction heating;
   each said coil segment having at least one winding and a ferromagnetic core element;
   a power supply having a switching system for independently applying a current signal to each of said coil segments to thereby cause said coil segments to produce a plurality of adjacently disposed magnetic fields;

a susceptor disposed in the magnetic fields of said coil segments, said susceptor being adapted for having a plurality of eddy current loops induced therein as a result of said magnetic fields;

said power supply switching system operating to periodically switch said current signals applied to said coil segments to cause said magnetic fields generated thereby to be shifted laterally periodically to produce overlapping eddy current loops in said susceptor, to thus provide an overall magnetic field of uniform density over an entire area of said weld zone to enable said susceptor to be substantially uniformly heated during a welding cycle.

15. The welding apparatus of claim 14, wherein said switching system of said power supply switches the current signals applied to said coil segments approximately every 0.5 seconds.

16. The welding apparatus of claim 14, further comprising a thermocouple for sensing the temperature of said weld zone defined by said coil assembly while said coil segments are being energized, and providing a signal to said power supply in accordance with said sensed temperature.

17. The welding apparatus of claim 16, wherein said power supply adjusts an output power thereof in accordance with said signal from said thermocouple.

18. The welding apparatus of claim 14, further comprising a controller for controlling said switching system of said power supply.

19. The welding apparatus of claim 14, further comprising:

a plurality of independent power supplies each having a switching system and at least one of said coil segments coupled to said switching system; and a computer for controlling said switching systems such that the energization of said coil segments are synchronized to achieve said overlapping eddy current loops.

20. A method of performing induction welding comprising the steps of:

disposing a plurality of independent coil segments adjacent one another along a surface of one of a pair of components to be welded to form a coil assembly of sufficient size to at least substantially cover a desired weld zone;

using a power supply to independently electrically energize each of said coil segments by applying a current signal to each said coil segment to cause a plurality of adjacently disposed magnetic fields to be produced within said weld zone;

using said magnetic fields to induce a plurality of eddy current loops in a susceptor disposed inbetween said pair of components;

causing a switching system of said power supply to periodically alter said current signal applied to selected ones of said coil segments to cause at least some of said magnetic fields to be periodically shifted laterally back and forth, thereby causing said eddy current loops in said susceptor to be periodically shifted laterally, thus producing a uniform heating of said susceptor during a welding cycle.

21. The method of claim 20, wherein said current signals applied to said selected ones of said coil segments are switched to adjacent ones of said coil segments approximately every 0.5 seconds to cause lateral back-and-forth shifting of said eddy current loops in said susceptor.

22. The method of claim 20, further comprising the step of using a thermocouple to sense the temperature of said weld zone.

23. The method of claim 20, further comprising the step of using a thermocouple to sense the temperature of said weld zone and generating a signal representative of said temperature; and modifying said current signals output by said power supply in accordance with said signal from said thermocouple to maintain a temperature of said weld zone within a desired temperature range.

24. The method of claim 20, further comprising the step of using a plurality of power supplies to independently apply power to each one of a corresponding plurality of coil packs, where each said coil pack includes a plurality of said coil segments.

25. The method of claim 24, further comprising the step of using a computer to synchronize operation of each of said power supplies to effect shifting of said eddy current loops formed in said susceptor.

* * * * *